(12) United States Patent
Wijerama

(10) Patent No.: US 8,476,343 B2
(45) Date of Patent: Jul. 2, 2013

(54) TOY PUTTY MATERIAL COMPOSITIONS

(75) Inventor: Roshan Wijerama, Warren, NJ (US)

(73) Assignee: Horizon Group USA, Warren, NJ (US)

( * ) Notice: Subject to any disclaimer, the term of this patent is extended or adjusted under 35 U.S.C. 154(b) by 0 days.

(21) Appl. No.: 12/584,685

(22) Filed: Sep. 10, 2009

(65) Prior Publication Data

US 2010/0064940 A1   Mar. 18, 2010

Related U.S. Application Data

(60) Provisional application No. 61/192,172, filed on Sep. 16, 2008, provisional application No. 61/201,340, filed on Dec. 9, 2008.

(51) Int. Cl.
*A61K 8/73*   (2006.01)

(52) U.S. Cl.
USPC ............... 524/55; 524/9; 524/27; 524/109; 524/388; 524/405

(58) Field of Classification Search
USPC .................. 524/55, 109, 388, 405, 9, 27
See application file for complete search history.

(56) References Cited

U.S. PATENT DOCUMENTS

| | | | | |
|---|---|---|---|---|
| 2,971,292 A | * | 2/1961 | Malecki | 47/58.1 R |
| 3,061,572 A | | 10/1962 | Packer | |
| 4,076,547 A | * | 2/1978 | Lester et al. | 106/779 |
| 4,094,694 A | | 6/1978 | Long | |
| 4,131,581 A | | 12/1978 | Coker | |
| 4,956,404 A | | 9/1990 | Pelzig | |
| 5,006,586 A | | 4/1991 | Touji et al. | |
| 5,395,873 A | | 3/1995 | Mizoule | |
| 5,506,290 A | * | 4/1996 | Shapero | 524/389 |
| 5,916,949 A | | 6/1999 | Shapero et al. | |
| 6,348,534 B1 | | 2/2002 | Bianco | |
| 6,444,199 B1 | * | 9/2002 | Renn | 424/78.26 |
| 6,680,359 B2 | | 1/2004 | Schoenheider | |
| 6,713,624 B1 | | 3/2004 | Doane, Jr. et al. | |
| 6,767,938 B1 | | 7/2004 | Cordova | |
| 6,864,346 B2 | | 3/2005 | Schoenheider | |
| 2003/0235662 A1 | * | 12/2003 | Pearce et al. | 428/34.1 |

FOREIGN PATENT DOCUMENTS

| | | |
|---|---|---|
| DE | 2935019 | 3/1981 |
| JP | 48-27905 | 2/1969 |
| JP | 5-1041-748 | 8/1974 |
| JP | 5-2047-034 | 10/1975 |
| JP | 51125446 | 11/1976 |
| JP | 54154-411 | 5/1978 |
| JP | 55052086 | 4/1980 |
| JP | 5-7034448 | 8/1980 |
| JP | 5-7059-940 | 9/1980 |
| JP | 6 3072-544 | 9/1980 |
| JP | 59036278 | 2/1984 |
| JP | 6 2172-060 | 1/1986 |

* cited by examiner

*Primary Examiner* — David W Wu
*Assistant Examiner* — Marie Reddick
(74) *Attorney, Agent, or Firm* — Lackenbach Siegel, LLP

(57) ABSTRACT

A putty material primarily used as a toy which is solid and capable of flowing for forming, preferably by manual manipulation, onto various pleasing shapes. This putty material is used primarily by children as an amusement device. The putty material is formed from a homogeneous mixture of primarily water, polyvinyl alcohol, gum, polyethylene terephthalate (PET) and a small amount of borax wherein the ratio by weight of borax to polyvinyl alcohol is preferably in the range of between 1:12 to 1:22. The toy modeling composition can be formed opaque or translucent and can be dyed, particularly when clear, to create various overall artistic effects, and glitter can be applied on the paste to create unusual aesthetic effects, particularly when using white glitter. Coloration can be applied to the materials with translucent ink or with a marker.

5 Claims, No Drawings

TOY PUTTY MATERIAL COMPOSITIONS

The present utility application hereby formally claims priority of currently U.S. Provisional Patent application No. 61/192,172 filed Sep. 16, 2008 on "TOY MODELING COMPOSITION" filed by the same inventor listed herein, namely, Roshan Wijerama, and assigned to the same assignee, namely, Horizon Group USA, Inc, and currently U.S. Provisional Patent application No. 61/201,340 filed Dec. 9, 2008 on "IMPROVED TOY MODELING COMPOSITION" filed by the same inventor listed herein, namely, Roshan Wijerama, and assigned to the same assignee, namely, Horizon Group USA, both of said referenced provisional applications are hereby formally incorporated by reference as an integral part of the present application.

BACKGROUND OF THE INVENTION

1. Field of the Invention

The present invention deals with the field of moldable solid materials such as putties and similar soft solid materials which are commonly used as toys or playthings by children which can be molded by hand or otherwise into various shapes and designs. The class of putty material to which the present invention pertains is the class of solid materials that can flow to at least some extent, that is, materials which can some type of a rigid form or to three-dimensional rigid structure to adhere onto to provide a somewhat rigid framework such that the material forms a layer thereover in a decorative manner. The material can also be formed independently into shapes without a separate rigid frameworks in certain applications. This type of putty material has a limited flowable characteristic such that it can be manipulated and kneaded by hand in an amusing and playful manner, preferably by children. Manual manipulation will also tend to heat the material to make it more pliable or flowable. The putty material can be stretched into sheets and can be rolled into longitudinally extending strings of material. The material is can be colored by the application of translucent ink or by using conventional markers in order to create various visual effects. Glitter can be added to the putty for creating pleasing aesthetic effects.

2. Description of the Prior Art

Many examples of putty or paste are shown in the prior art which are designed for manual manipulation for fun and enjoyment or other purposes such as shown in U.S. Pat. No. 3,061,572 patented Oct. 30, 1962 to M. Packer on a "Polyvinyl, Acetate And A Mixture Of A Compatible And Incompatible Plasticizer And Method Of Preparation"; and U.S. Pat. No. 4,094,694 patented Jun. 13, 1978 to W. J. Long and assigned to United States Gypsum Company on a "Water-Resistant Gypsum Composition And Products, And Process Of Making Same"; and U.S. Pat. No. 4,131,581 patented Dec. 26, 1978 to J. N. Coker and assigned to E.I. Du Pont de Nemours and Company on "Adhesive Compositions Consisting Essentially Of A Vinyl Alcohol Polymer, A Crystalline Solvent And A Viscosity Reducing Diluent"; and U.S. Pat. No. 4,956,404 patented Sep. 11, 1990 to J. Pelzig on a "Plastic Composition For Toys, Novelty Items And Arts And Crafts"; and U.S. Pat. No. 5,006,586 patented Apr. 9, 1991 to D. Touji et al and assigned to Sumitomo Rubber Industries, Limited on a "Heat Reserve Material"; and U.S. Pat. No. 5,395,873 patented Mar. 7, 1995 to H. Mizoule on a "Toy Paste Based In Polyvinyl Alcohol"; and U.S. Pat. No. 5,916,949 patented Jun. 29, 1999 to W. H. Shapero et al and assigned to Mattel, Inc. on "Moldable Compositions And Method Of Making The Same"; and U.S. Pat. No. 6,348,534 patented Feb. 19, 2002 to M. Bianco on a "Gel Toy"; and U.S. Pat. No. 6,680, 359 patented Jan. 20, 2004 to C. J. Schoenheider on a "Moldable Composition"; and U.S. Pat. No. 6,713,624 patented Mar. 30, 2004 to L. E. Doane, Jr. and assigned to Hasbro, Inc. on a "Starch-Based Modeling Compound"; and U.S. Pat. No. 6,767,938 patented Jul. 27, 2004 to A. Cordova and assigned to Mattel, Inc. on a "Modeling Dough And A Surface Active Drying Agent Coating Composition For Same"; and U.S. Pat. No. 6,864,346 patented Mar. 8, 2005 to C J. Schoenheider on "Moldable Compositions"; and also German Patent No. 2935019 dated March 1981; and Japanese Patent No. 0027905 dated August 1973; and Japanese Patent 0041748 dated April 1976; and 51-125446 dated November 1976; and Japanese Patent 0047034 dated April 1977; and Japanese Patent 0154411 dated December 1979; and Japanese Patent 55-052086 dated April 1980; and Japanese Patent 0034148 dated February 1982; and Japanese Patent 0059940 dated April 1982; and Japanese Patent 59-036278 dated February 1984; and Japanese Patent 2172060 dated July 1987; and Japanese Patent 3072544 dated April 1988.

OBJECTS OF THE INVENTION

It is an object of the composition for a putty material of the present invention to have critical levels of physical elasticity to allow the material to be capable of being stretched without snapping to form sheets or panels by manual manipulation.

It is an object of the composition for putty material of the present invention to be capable of mixture with glitter or other particulate metallic components of various sizes and configurations to create pleasing physical appearances.

It is an object of the composition for putty material of the present invention to be mixable with various pigments for providing different colorations to the material for aesthetic purposes.

It is an object of the composition for putty material of the present invention to be capable of being formed into three dimensional forms which can then have coloration applied to the exterior surface thereof to create pleasing visual appearances.

It is an object of the composition for putty material of the present invention to be capable of adhering onto three dimensional forms and extending thereover to at least partially assume the shape of the form and then have coloration applied to the exterior surface thereof, such as by a conventional marker or with translucent ink to present a unique and pleasing visual effect which can be varied as desired by the user.

It is an object of the composition for putty material of the present invention to be capable of being formed into three dimensional forms which can then have coloration applied to the exterior surface thereof by contacting of the writing nib of a conventional marker thereonto such that the pigment of the marker will be absorbed into the exterior surface of the putty material to present a unique visual effect which is particularly pleasing when the putty is clear and can include a white glitter component mixed therewith.

It is an object of the composition for putty material of the present invention to be easily manipulated by hand without feeling sticky to the touch of the user and without forming any residue on the hands of the user.

It is an object of the composition for putty material of the present invention to easily stretch into panel shapes or curtain forms without pulling or snapping apart.

It is an object of the composition for putty material of the present invention to be capable of having air injected into small portions of material such that the materials expands outwardly generally equally to form air filled bubbles of various sizes formed of the putty material.

It is an object of the composition for putty material of the present invention to be capable of being stretched and spun to form long lengths of cylindrically shaped materials such as experienced during the ancient practice of noodle-making.

It is an object of the composition for putty material of the present invention to be capable of being wrapped around plastic forms and surfaces and other three-dimensional sculptures to make artistic designs thereover.

It is an object of the composition for putty material of the present invention to be engageable with three-dimensional mesh forms for making window art or other decorative three-dimensional items after being urged through the openings defined in the mesh.

It is an object of the composition for putty material of the present invention to be capable of being warmed to greater than room temperature by holding thereof within the hand of a person manipulating the material to provide added flexibility or flowability thereof.

It is an object of the composition for putty material of the present invention to be capable of being formed into three dimensional forms which can then have coloration applied to the exterior surface thereof by a conventional marker such that the pigment of the marker itself will be absorbed into the surface of the putty material wherein various colors can be used to present different overall artistic visual appearances.

DETAILED DESCRIPTION OF THE PREFERRED EMBODIMENT

The unique composition of matter which forms the flowable putty material is a very critical aspect of the present invention. A preferred formulation for this composition of matter usable in accordance with the present invention is shown in the below chart.

|  | Percentage By Weight |
| --- | --- |
| Water | 67.7% |
| Polyvinyl Alcohol | 13.1% |
| Propanediol | 10.8% |
| Borax | 00.8% |
| Preservative* | 00.5% |
| Xanthan Gum | 2.00% |
| Glitter | 5.00% |
| Naringin | 0.10% |

*The preferred preservative is 1-[1,3-bis(hydroxymethyl)-2,5-dioxo-imidazolidin-4-yl]-1,3-bis(hydroxymet- hyl)urea.

The percentages by weight set forth in the chart above and the components of the composition detailed therein are only approximate and other compositions will work as long as they are generally in the same ratios with similar components. Most particularly, the ratio of borax to polyvinyl alcohol is preferred to be in the range of between 1:12 to 1:22. The use of borax in this very small percentage relative to the polyvinyl alcohol is an important advantage of the formulation of the present invention because it allows the putty material to stretch and flow with significantly enhanced characteristics.

This formulation of this invention also allows the putty material to be very flexible even when somewhat dry or under low conditions of humidity and will prevent cracking. The putty material of this formulation is particularly useful included within toy activity kits that can be used to make jewelry, window art, play sets, activity kits and many other creative related items. Also this formulation maintains the important characteristics thereof when mixed with higher concentrations of glitter which is very useful for the purpose of allowing children to provide unique items made with the more decorative putty material which contains an attractive glitter component, particularly white glitter.

This putty material having this general formulation is particularly useful for play since it can be stretched as needed into long cylindrical columns or in panels and can be used also to inflate while forming bubbles. It can sometimes snap and/or pop if stretched beyond the capability of the material and it also can also be used to bounce to a limited extent similar to bouncing a ball.

The putty composition shown above is particularly useful for forming a flowable putty material which is not sticky to when touched or manipulation by hand but is still capable of stretching significantly into panels or long cylindrical sections without unwanted snapping or disengagement. The elasticity characteristics of the putty material are important because it needs to be capable of stretching in various modes to be capable of many different manners of manipulation such as above described.

Various types of glitter can be used with the material of the present invention and, in particular, the smaller sizes of glitter can be used to form a final putty material which has a pearlescent or pearl-like glitter appearance. Larger sized glitter can be used if a larger metal flake or a chunky appearance is desired. Different sizes can be used with different colors for achieving different appearances and effects as desired.

The material made in accordance with the above-described formulation is particularly usable for hand manipulation or kneading and has been formulated such that when manipulated by hand, no residue is left upon the surface of the fingers or hands. When placed into the hand, the material will become slightly heated above ambient temperature due to the heat from the user's body and this added heat can enhance the flowable characteristics thereof. The putty material normally feels cool and wet to the touch and these characteristics will vary somewhat dependent upon the amount of humidity in the air and the resulting variation in the total moisture content in the putty material itself.

One of the important characteristics of the putty material using the composition set forth herein is in the capability of spreading the material wide and then stretching it out to form large panels or curtains or sheets which are somewhat translucent and yet suspend the glitter therewithin for a very decorative and appealing visual effect particularly when looking at or through the sheets of material.

When the putty material is stretched or pulled apart it sometimes separates by snapping which is initially undesirable but will always ultimately occur if a significant amount of stretching is performed beyond the designed capabilities of the material. When the material becomes rigid because a significant portion of the moisture within the material has been lost then the material will snap more easily.

One of the unique manners of use of the present invention is to place one end of a small straw into the center of a small piece of material and blow through the straw which will cause the putty material to expand into a bubble filled with air.

It is also possible to stretch the putty material into long cylindrical pieces wherein the weight of the material itself is sufficient to cause it to gently fall downwardly and then spin it horizontally in a motion similar to the commonly known ancient Chinese practice used for the purposes of forming paste noodles. For this purpose it is important that the correct elasticity or moisture content of the material be maintained in order to maintain the shape of the long cylindrical piece of toy paste as it is spun into the shape of a noodle.

Another important aspect of usage of the composition of matter of the flowable putty material of the present invention is in the capability of manually forming the material into many different physical sizes and shapes. The material is significantly flowable due to the particular characteristics of the specific composition of the toy putty set forth herein and, for this reason, will sometimes be difficult to use in such a manner as to hold shape by itself. However, when formed over somewhat rigid three-dimensional items such as a form or the like, a shape can be more easily maintained. For example, a plastic horse can have sections of thin flowable glitter lava material molded in thin layers across the horse in such a manner as to achieve a three-dimensional artistic effect over the rigid form. Plastic bugs or plastic horses or any somewhat rigid three-dimensional form, commonly made of mesh plastic or metal or other similar material, can be used for this purpose.

Another manner of maintaining the shape of this flowable putty material is to use somewhat flat two-dimensional forms which have a plurality of interstices therein to allow the material to flow through these apertures to form flat primarily two-dimensional designs or constructions by allowing the material of the glitter lava to be secured to the form extending through the apertures defined therein. Normally the forms are made of a flat mesh or screen material and the flowable molding material of the present invention is positioned in engagement with the apertures defined in the form, preferably extending therethrough to some extent, for the purpose of defining unique items such as pieces of window hanging art or other generally flat articles.

One of the more unique aspects of the composition of matter of the present invention is the possible use thereof as a substrate for coloration such as by using markers or by applying translucent ink onto the three dimensional items designed and formed therewith. Coloration can be performed in many different ways. One of the manners of coloration makes use of conventional writing instrument marking pens. The dyes used in such markers or marking pens as commonly available mass marketed at the current time have been found to be capable of easily marking the exterior surface of the putty composition of the present invention. Thus, when a three dimensional article is formed it can then be easily colored with such markers which are available in many various colors. The dye from the markers is easily applied onto the exterior of the three dimensional items formed with the composition of matter of the putty of the present invention. Thus, an article can be conveniently colored with markers similar to conventional coloring upon three dimensional substrates. This manner of decorating the three dimensional items formed using the improved putty composition of the present invention yields particularly unique artistic effects when used with clear putty containing glitter, especially white colored glitter. Marker dye or transparent ink has the capability to color the exterior surface of the putty to the many various colors available in such markers being mass marketed today as stationary supplies.

While particular embodiments of this invention have been described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A composition of matter for a putty material usable for amusement which is solid and flowable and can be manually manipulated and formed into many shapes and forms wherein the ratio by weight of borax to polyvinyl alcohol is in the range between 1:12 and 1:22, said composition consisting essentially of the following materials by weight within the total composition of matter:

| | |
|---|---|
| A. water | 60% to 80%; |
| B. polyvinyl alcohol | 10% to 15%; |
| C. propanediol | 5% to 15%; |
| D. borax | less than 2%; |
| E. preservative | less than 1%;; |
| F. xanthan gum | about 2% less to than 5%; |
| G. glitter | 1% to 10%; and |
| H. naringin | less than 1%. |

2. A composition of matter for a putty material usable for amusement which is solid and flowable and can be manually manipulated and formed into many shapes and forms wherein the ratio by weight of borax to polyvinyl alcohol is in the range between 1:12 and 1:22, said composition consisting essentially of the following materials by approximate weight within the total composition of matter:

| | |
|---|---|
| A. water | 67.7%; |
| B. polyvinyl alcohol | 13.1%; |
| C. propanediol | 10.8%; |
| D. borax | 00.8%; |
| E. preservative | 00.5%; |
| F. xanthan gum | 2.00%; |
| G. glitter | 5%; and |
| H. naringin | 0.10%. |

3. A toy putty material composition that is manually manipulatable to retain a desired shape, said composition comprises an aqueous solution of borax and a polyvinyl alcohol, wherein the ratio of polyvinyl alcohol to water is in the range of between 1:7 and 1:3 by weight; and further comprises about 2% to less than 5% by weight of xanthan gum, whereby the material is manually manipulated to and retains a desired shape.

4. The toy putty material composition of claim 3, further comprising glitter lava.

5. The toy putty material composition of claim 3, further comprising a dye disposed on the exterior of the material in the desired shape.

* * * * *